US009904588B2

(12) United States Patent
Wang et al.

(10) Patent No.: US 9,904,588 B2
(45) Date of Patent: Feb. 27, 2018

(54) METHOD OF PREVENTING MISOPERATIONS ABOUT A RELAY PROTECTION DEVICE IN A SMART SUBSTATION

(71) Applicants: XJ GROUP CORPORATION, Xuchang (CN); XJ ELECTRIC CO., LTD, Xuchang (CN); XUCHANG XJ SOFTWARE TECHNOLOGIES LTD, Xuchang (CN); STATE GRID CORPORATION OF CHINA, Beijing (CN)

(72) Inventors: Leitao Wang, Xuchang (CN); Zhen Li, Xuchang (CN); Junhong Qiu, Xuchang (CN); Xing Liu, Xuchang (CN); Lintao Ma, Xuchang (CN); Lunshan Zhang, Xuchang (CN); Ruizhi Jiang, Xuchang (CN); Xinling Li, Xuchang (CN); Juan Ji, Xuchang (CN); Meng Li, Xuchang (CN); Bao Zhao, Xuchang (CN); Huawei Jia, Xuchang (CN)

(73) Assignees: XJ GROUP CORPORATION, Xuchang (CN); XJ ELECTRIC CO., LTD., Xuchang (CN); XUCHANG XJ SOFTWARE TECHNOLOGIES LTD., Xuchang (CN); STATE GRID CORPORATION OF CHINA, Beijing (CN)

(*) Notice: Subject to any disclaimer, the term of this patent is extended or adjusted under 35 U.S.C. 154(b) by 137 days.

(21) Appl. No.: 15/076,361

(22) Filed: Mar. 21, 2016

(65) Prior Publication Data
US 2017/0060670 A1 Mar. 2, 2017

(30) Foreign Application Priority Data
Aug. 31, 2015 (CN) .......................... 2015 1 0551057

(51) Int. Cl.
*G06F 11/07* (2006.01)
*H02H 1/00* (2006.01)

(52) U.S. Cl.
CPC ...... *G06F 11/0793* (2013.01); *G06F 11/0721* (2013.01); *H02H 1/0092* (2013.01)

(58) Field of Classification Search
CPC .................. G06F 11/0721; G06F 11/0793
See application file for complete search history.

(56) References Cited

U.S. PATENT DOCUMENTS

| 8,510,713 B1* | 8/2013 | Ormandy ................ G06F 21/57 714/38.1 |
| 2002/0007428 A1* | 1/2002 | Chilton ................. G06F 3/0619 710/52 |

(Continued)

*Primary Examiner* — Yolanda L Wilson
(74) *Attorney, Agent, or Firm* — Platinum Intellectual Property LLP

(57) ABSTRACT

The present invention relates to a method of preventing misoperation about a relay protection device in a smart substation. Reversely operating CPU operation results of two operation records about the relay protection device, in order to form corresponding disassembler codes. According to disassembler codes, calculating similarity of the CPU operation results of the two operation records about the relay protection device by a structured method. Judging whether the similarity is greater than a set threshold or not. If the similarity is greater than the set threshold, the CPU operation results of the two operation records about the relay protection device to be the same, otherwise, the CPU operation results of the two operation records about the relay protection device are judged to be different. The present invention avoids the misoperations of the relay protection device on operation.

5 Claims, 3 Drawing Sheets

(56) References Cited

U.S. PATENT DOCUMENTS

| | | | |
|---|---|---|---|
| 2002/0138748 A1* | 9/2002 | Hung | G06F 21/6281 713/190 |
| 2005/0183069 A1* | 8/2005 | Cepulis | G06F 11/3636 717/128 |
| 2007/0250820 A1* | 10/2007 | Edwards | G06F 11/3636 717/131 |
| 2008/0222215 A1* | 9/2008 | Bai | G06F 21/568 |
| 2009/0158260 A1* | 6/2009 | Moon | G06F 11/3612 717/133 |
| 2014/0366006 A1* | 12/2014 | Gottschlich | G06F 11/3664 717/125 |

\* cited by examiner

METHOD OF PREVENTING MISOPERATIONS ABOUT A RELAY PROTECTION DEVICE IN A SMART SUBSTATION

TECHNICAL FIELD

The present invention relates to a method of preventing misoperation about a relay protection device in a smart substation, belonging to the field of the relay protection about the electric power system.

BACKGROUND

Along with technical advance, accumulation of construction experience and increasing perfection of related standards, the smart substation in our country enters into a rapid development stage. As the important part of the substation and the safeguard of security and stability of the power, the number of operation and maintenance about the relay protection device is increasing. How to prevent the misoperations about the relay protection device in operation, especially in the process of the reconstruction and expansion of the smart substation has caught the high attentions of all the electric power companies.

Nowadays, the relay protection devices debugging of the smart substation must be finished before commissioning. In the process of debugging, it usually refers to some operations, such as, cast and back of a binder plate, revision of controlling words and fixed values. After operating, it also refers to the cast and the back of the blinder plate and the revision of data because of reconstruction and expansion in the substation. In the process of the above, the methods of preventing the misoperation about the relay protection devices in the smart substation are most tests and cross-checked related design documents before commissioning. After commissioning, in the process of operation and maintenance, the method is opening operation ticket and operating strictly in accordance with the operation ticket and the relevant provisions. Because of reconstruction and expansion of the smart substation, the number of the operating relay protection devices is growing and the division boundary of each profession becomes increasingly obscure on account of technology integration. Therefore, it causes that the number of configuration and the professional level of operation and maintenance about personnel are difficult to meet the demand of the practical engineering which brings some hidden trouble to the misoperation about the relay protection device.

SUMMARY

The purpose of the present invention is to provide a method of preventing misoperation about a relay protection device in a smart substation and solve the problems of the misoperation which appear in the process of debugging and reconstruction and expansion of the smart substation.

To solve the above technical problems, the present invention provides a method of preventing the misoperation about the relay protection device in the smart substation. The steps of the method are as follows:

1) in order to form corresponding disassembler codes, reversely operating CPU operation results of two operation records about the relay protection device;

2) according to disassembler codes, calculating similarity of the CPU operation results of the two operation records about the relay protection device by a structured method;

3) in order to realize discriminant of the misoperation, judging whether the similarity is greater than a set threshold or not, if the similarity is greater than the set threshold, the CPU operation results of the two operation records about the relay protection device are judged to be the same, otherwise, the CPU operation results of the two operation records about the relay protection device are judged to be different.

The processes of calculating the similarity by the structured method, mentioned at step 2), are as follows:

A. respectively extracting function structure information in the disassembler codes of the two operation records;

B. generating signatures of all functions and basic blocks in the disassembler codes, and determining a function matching set according to the signatures;

C. comparing internal basic blocks of matching function pairs, and determining similarity of the functions;

D. calculating the similarity of the CPU operation results of the two operation records about the relay protection device according to weight and corresponding similarity of each function.

The similarity S of the CPU operation results of the two operation records about the relay protection device is as follows:

$$S = \frac{\sum (S_i \cdot \lambda_i)}{\sum \lambda_i} \times 100\%$$

therein, $S_i$ is the similarity of the functions i, and $\lambda_i$ is the weight of each function i.

A calculation formula of the weight of each function $\lambda$ is as follows:

$$\lambda = \sqrt{\omega_{call}^2 + \omega_{node}^2 + \omega_{edge}^2}$$

therein, $\omega_{call}^2$ is a function call number, $\omega_{node}^2$ is a basic block number, and $\omega_{edge}^2$ is a jumping edge number.

The similarity of the functions $S_i$ is determined as follows:

$S_i$=matching basic block number between new operation record function i and old operation record function j/including basic block number between new operation record function i and old operation record function j (i=1, 2, ..., n; j=1, 2, ..., m)

therein, n is number of the new operation record function i, and m is number of the old operation record function j.

As described at step 1) to step 3), the method is operated by an analysis module in a FLASH memory which is set in the relay protection device.

The method further comprises a step of showing a judgment result that comes from the step 3).

The advantages of the present invention are as follows: firstly, in order to form the corresponding disassembler codes, reversely operating the CPU operation results of the two operation records about the relay protection device. Secondly, according to the disassembler codes, calculating the similarity of the CPU operation results of the two operation records about the relay protection device by a structured method. Finally, judging whether the similarity is greater than a set threshold or not. If the similarity is greater than the set threshold, the CPU operation results of the two operation records about the relay protection device are judged to be the same, otherwise, the CPU operation results of the two operation records about the relay protection device are judged to be different. Through the above process, operator compares the actual operation result with the correct result that should be achieved and then judges whether the result is the same or not in order to judge whether the relay protection device has been wrongly operated or not. On the one hand, the present invention avoids the misoperation about the relay protection device on operation, especially in the process of the reconstruction and expansion of the smart substation, which is beneficial to reduce the probability of accidents in the operation of the relay protection device. On the other hand, the present invention provides a valuable reference for operator about whether the operation of the relay protection device is correct or not, which is beneficial to reduce the working strength of operator and improve the working efficiency.

DETAILED DESCRIPTION

The present invention will be described in detail hereinafter by its drawings.

The present invention provides a method of preventing misoperation about a relay protection device in a smart substation.

Figure 1:
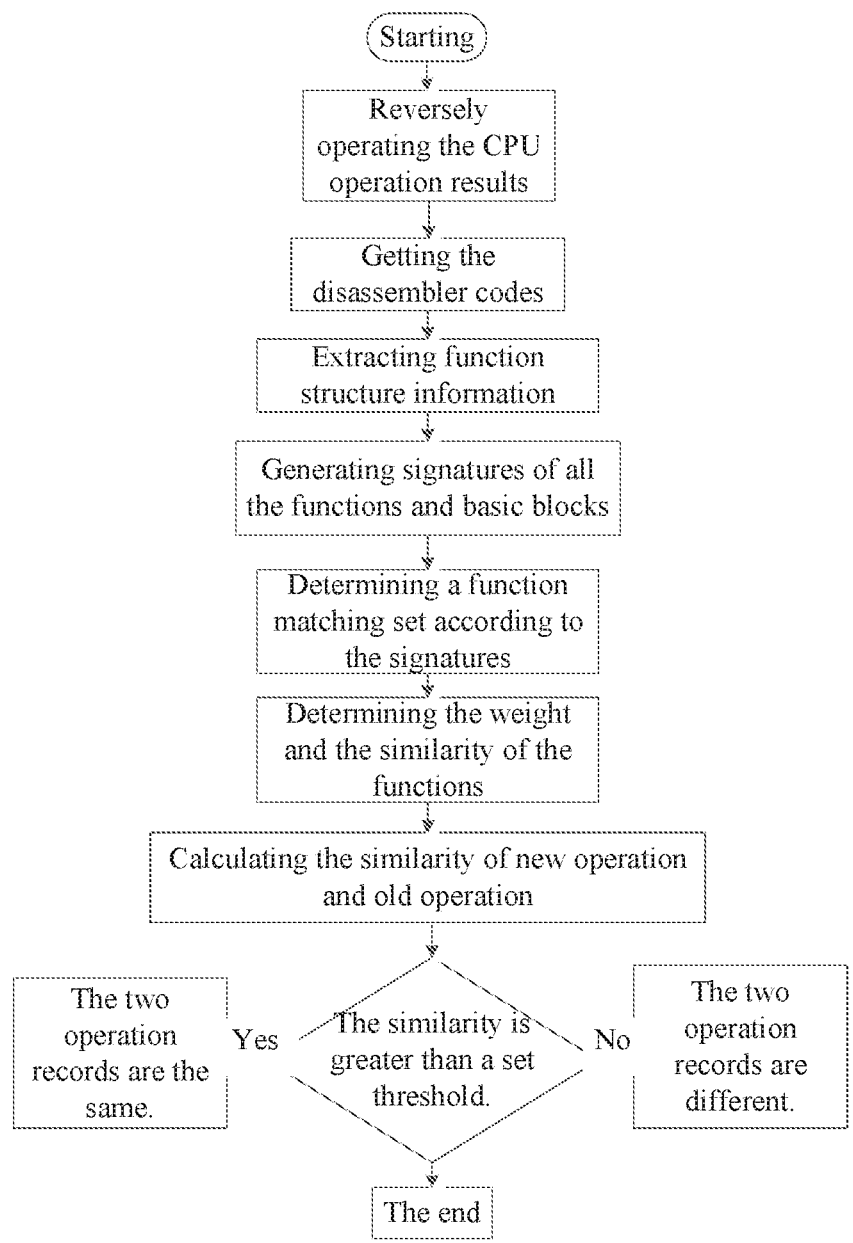
FIG. 1 is a comparing flow chart of new operation result and old operation result structured.

In order to prevent the misoperation of the relay protection device during debugging and operating, the method of preventing the misoperation about the relay protection device is mainly applied to the smart substation, especially in the process of the reconstruction and expansion of the smart substation. The process of the method is shown in FIG. 1. Firstly, in order to form corresponding disassembler codes, reversely operating CPU operation results of two operation records about the relay protection device. Secondly, according to disassembler codes, calculating the similarity of the CPU operation results of the two operation records about the relay protection device by a structured method. Finally, judging whether the similarity is greater than a set threshold or not. If the similarity is greater than the set threshold, the CPU operation results of the two operation records about the relay protection device are judged to be the same, otherwise, the CPU operation results of the two operation records about the relay protection device are judged to be different. Through the above process, operator compares the actual operation result with the correct result that should be achieved and then judges whether the result is the same or not, in order to judge whether the relay protection device has been wrongly operated or not.

Figure 4:
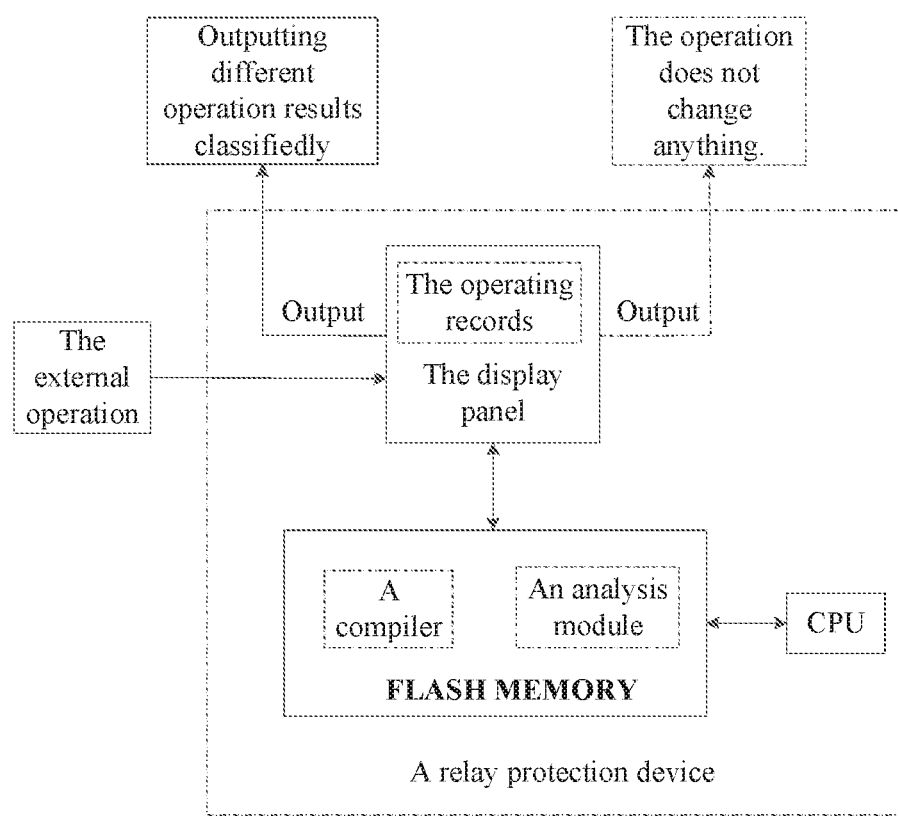
FIG. 4 is a comparing output chart of information transmission of new operation result and old operation result.

The present invention will be described in detail hereinafter by a new operation record and an old operation record. Therein, the new operation record is the newest operation record, and the old operation record is the last operation record which is closest to the new operation record. The method is realized by an analysis module of a FLASH memory which is set in the relay protection device, which is shown in FIG. 4. The related operation records are transmitted to the FLASH memory by the display panel of the relay protection device during operating the relay protection device. Related instructions and data are obtained from the FLASH memory for the processing of CPU. And then the result of processing is fed back to the FLASH memory.

1. In order to form the corresponding disassembler codes, reversely operating the CPU operation results of the two operation records about the relay protection device.

In order to form the corresponding disassembler codes, when the CPU operation results have been transmitted to the FLASH memory, CPU sends a call to the analysis module. The analysis module calls the CPU operation results of the new operation record and the old operation record from the FLASH memory.

2. According to the disassembler codes, calculating the similarity of the CPU operation results of the two operation records about the new operation record and the old operation record about the relay protection device.

The step is processed by comparing the CPU operation results by a structured method and the analysis module. The specific steps are as follows:

A. respectively extracting function structure information in the disassembler codes of the two operation records about the new operation record and the old operation record;

B. reading data of all functions, decomposing calling relation of each function, constitution of the internal basic blocks and internal instruction information of the internal basic blocks, and generating signatures of all the functions and basic blocks in order to match each function with others. Selecting functions that each function of the new operation record is the most similar with all the functions of the old operation record as matching function pairs, and then setting up a matching set of all the functions of the two operation records;

C. comparing the internal basic blocks of the matching function pairs, and determining the similarity of the functions.

The similarity of the functions $S_i$ is determined as follows:

$S_i$=matching basic block number between new operation record function i and old operation record function j/including basic block number between new operation record function i and old operation record function j (i=1, 2, ..., n; j=1, 2, ..., m)

Therein, n is number of the new operation record function i, and m is number of the old operation record function j.

D. calculating the similarity of the CPU operation results of the two operation records about the relay protection device according to weight and corresponding similarity of each function.

A calculation formula of the weight of each function λ is as follows:

$$\lambda = \sqrt{\omega_{call}^2 + \omega_{node}^2 + \omega_{edge}^2}$$

Therein, $\omega_{call}^2$ is a function call number, $\omega_{node}^2$ is a basic block number, and $\omega_{edge}^2$ is a jumping edge number.

The similarity S of the CPU operation results of the two operation records about the relay protection device is as follows:

$$S = \frac{\sum (S_i \cdot \lambda_i)}{\sum \lambda_i} \times 100\%$$

Therein, $S_i$ is the similarity of the functions i, and $\lambda_i$ is the weight of each function i.

3. Judging whether the similarity is greater than a set threshold or not. If the similarity is greater than the set threshold, the CPU operation results of the two operation records about the relay protection device are judged to be the same, otherwise, the CPU operation results of the two operation records about the relay protection device are judged to be different.

Figure 2:
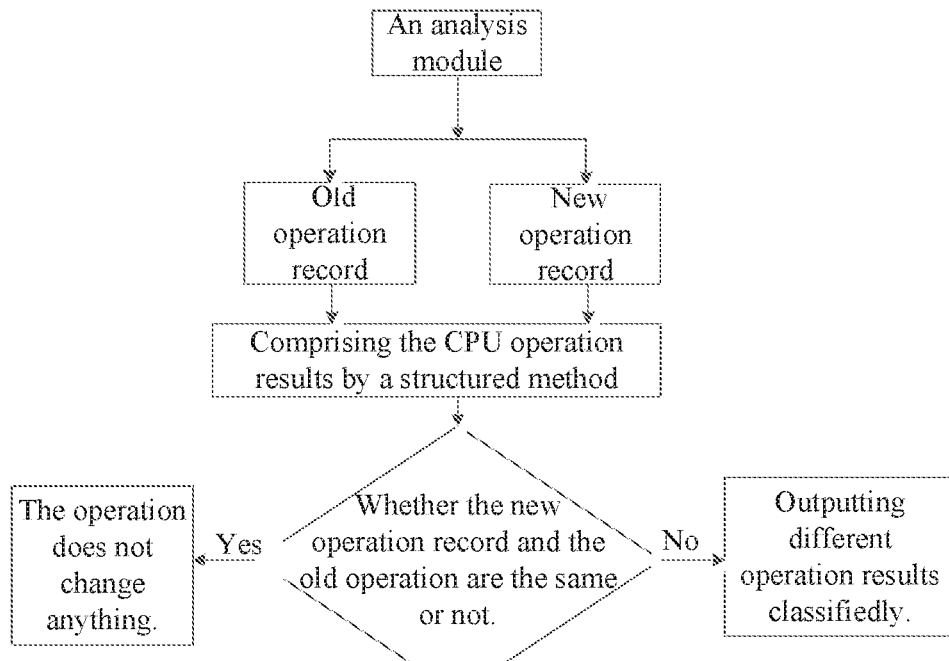
FIG. 2 is a comparing output chart of new operation result and old operation result.
Figure 3:
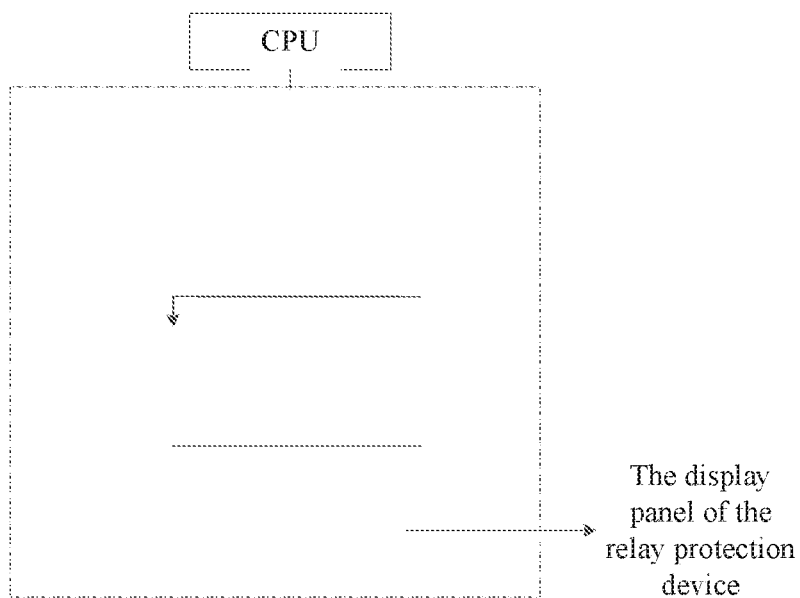
FIG. 3 is an information transmission schematic diagram among a FLASH memory, CPU and a display panel.

The analysis module that is shown in FIG. 2 compares the new operation record with the old operation record. If the comparing result is same, outputting "The operation does not change anything.", otherwise, classifiedly outputting different operation results. The above judging result that is shown in FIG. 3 is fed back to the display panel of the relay protection device.

After the display panel of the relay protection device receives the judging result that is from the FLASH memory, the operator views the difference between the new operation record and the old operation record by browsing the option of menu "operation records". The operator compares the actual operation result with the correct result that should be achieved, and then judges whether the result is the same or not, in order to judge whether the relay protection device has been wrongly operated or not. The above information transmission and the output of the result are shown in FIG. 4.

Although the embodiments of the present invention have been disclosed above, it is not limited to the applications those are set forth in the specification and embodiments. The basic idea of the present invention lies in the basic solution. For the ordinary technicist in this field, other modifications of models, formulas and parameters may be easily achieved. Changes, modifications, replacements and variants of execution mode are still fallen in the protection scope of the present invention which does not break away from the principle and the spirit of the present invention.

What is claimed is:

1. A method of preventing misoperation about a relay protection device in smart substation, characterized by comprising:
    1) in order to form corresponding disassembler codes, reversely operating CPU operation results of two operation records about the relay protection device;
    2) according to disassembler codes, calculating similarity of the CPU operation results of the two operation records about the relay protection device by a structured method;
    3) in order to realize discriminant of the misoperation, judging whether the similarity is greater than a set threshold or not, if the similarity is greater than the set threshold, the CPU operation results of the two operation records about the relay protection device are judged to be the same, otherwise, the CPU operation results of the two operation records about the relay protection device are judged to be different, wherein the processes of calculating the similarity by the structured method which is mentioned at step 2) are as follows:
    A. respectively extracting function structure information in the disassembler codes of the two operation records;
    B. generating signatures of all functions and basic blocks in the disassembler codes, and determining a function matching set according to the signatures;
    C. comparing internal basic blocks of matching function pairs, and determining similarity of the functions;
    D. calculating the similarity of the CPU operation results of the two operation records about the relay protection device according to weight and corresponding similarity of each function; and
wherein, the similarity S of the CPU operation results of the two operation records about the relay protection device is as follows:

$$S = \frac{\sum (S_i \cdot \lambda_i)}{\sum \lambda_i} \times 100\%$$

therein, Si is the similarity of the functions i, and λi is the weight of each function i.

2. The method of claim 1, characterized in that, a calculation formula of the weight of each function λ is as follows:

$$\lambda = \sqrt{\omega_{call}^2 + \omega_{node}^2 + \omega_{edge}^2}$$

therein, $\omega_{call}^2$ is a function call number, $\omega_{node}^2$ is a basic block number, and $\omega_{edge}^2$ is a jumping edge number.

3. The method of claim 2, characterized in that, the similarity of functions Si is determined as follows:
    $S_i$=matching basic block number between new operation record function i and old operation record function j/including basic block number between new operation record function i and old operation record function j (i=1, 2, . . . , n; j=1, 2, . . . , m)
    therein, n is number of the new operation record function, and m is number of the old operation record function j.

4. The method of claim 1, wherein step 1) to step 3) is conducted by an analysis module of a FLASH memory which is set in the relay protection device.

5. The method of claim 4, characterized in that, the method further comprises a step of showing a judgment result that comes from the step 3).

* * * * *